United States Patent
O'Toole

(10) Patent No.: US 9,840,340 B2
(45) Date of Patent: Dec. 12, 2017

(54) DRONE DOCKING STATION AND DELIVERY SYSTEM

(71) Applicant: Dan O'Toole, Carmel, IN (US)

(72) Inventor: Dan O'Toole, Carmel, IN (US)

( * ) Notice: Subject to any disclaimer, the term of this patent is extended or adjusted under 35 U.S.C. 154(b) by 0 days.

(21) Appl. No.: 14/565,418

(22) Filed: Dec. 9, 2014

(65) Prior Publication Data
US 2016/0159496 A1    Jun. 9, 2016

(51) Int. Cl.
*B64F 1/32*    (2006.01)

(52) U.S. Cl.
CPC ..................... *B64F 1/32* (2013.01)

(58) Field of Classification Search
CPC ..................... B64F 1/32; B64F 1/36
See application file for complete search history.

(56) References Cited

U.S. PATENT DOCUMENTS

| 8,880,241 B2 * | 11/2014 | Mohamadi | ............. B64C 19/00 244/190 |
| 2015/0158599 A1 * | 6/2015 | Sisko | ..................... B64F 1/32 244/114 R |

* cited by examiner

*Primary Examiner* — Justin M Benedik
(74) *Attorney, Agent, or Firm* — Ritchison Law Offices, PC; John D Ritchison

(57) ABSTRACT

Disclosed herein is a drone docking station for deposit of items delivered by drone. Items may include food items, groceries, parcels and others. A secure porch, roof, window or otherwise building mounted box may be secured through to an existing edifice or may be configured to mount to an existing mailbox post. The basic elements making up the components of the box enable it to carry out efficient and secure delivery of goods to a container box located at a specific address and to securely hold those goods until they are picked-up regardless of duration, weather, or otherwise. The drone dock may employ different technological devices to provide for communication between the drone docking station and a drone to provide security and preservation of the delivered goods before during and after delivery.

11 Claims, 2 Drawing Sheets

END VIEW

DRONE DOCKING STATION AND DELIVERY SYSTEM

CROSS-REFERENCE TO RELATED APPLICATIONS & CONTINUITY DATA

N/A

BACKGROUND OF THE INVENTION

As drone delivery becomes ubiquitous the volume of unattended parcels dropped at businesses and residences will significantly increase. The high volume of parcels dropped will increase the exposure of theft, damage, etc. Thus there is a need for a drone compatible secure delivery box that can reliably receive goods delivered from a drone. There is also a need for a safe container to house items that are to be picked up by a drone. The Drone Dock will save shippers significant amounts of money through the secure storage of delivered and stored goods, products and items.

FIELD OF THE INVENTION

The invention relates to drones and delivery of parcels or goods.

SUMMARY OF THE INVENTION

Disclosed herein is a system and device for a drone docking station for deposit of items delivered by drone. Items may include but not be limited to food items, groceries and parcels. A secure porch, roof, window or otherwise building mounted box may be secured through to an existing edifice or may be configured to mount to an existing mailbox post and/or take the place of the mailbox.

In its preferred embodiment the box may accommodate any item within size parameters that are drone deliverable. Typically a drone can carry a parcel the size of 2 feet times 2 feet and weighing around 5 lbs, however the disclosure is not limited by any particular size delivery provided it can be carried by a drone. The drone dock may be made of either an abs plastic or steel construction or other suitable material.

The basic elements making up the components of the box enable it to carry out efficient and secure delivery of goods to a container box located at a specific address, and to securely hold those good until they are picked up regardless of duration, weather, or otherwise. The drone dock may employ many different technological devices in order to provide for communication between the drone dock and a drone, provide for security and preservation of the delivered goods before during and after delivery.

BRIEF DESCRIPTION OF THE DRAWINGS FIGURES

Figure 1:
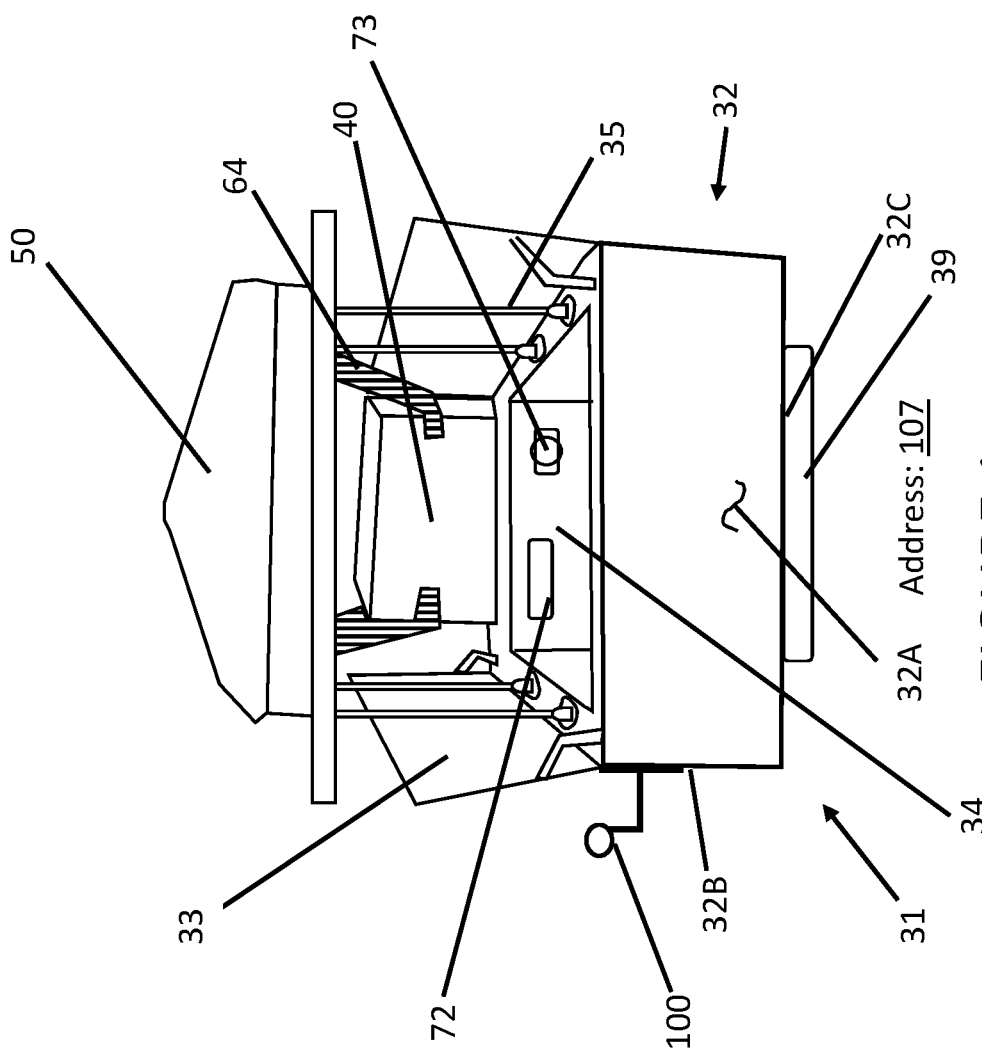

FIG. 1. The figure shows a general embodiment indicating some of the features of the invention herein. Shown is a drone interfacing with a delivery container.

Figure 2:
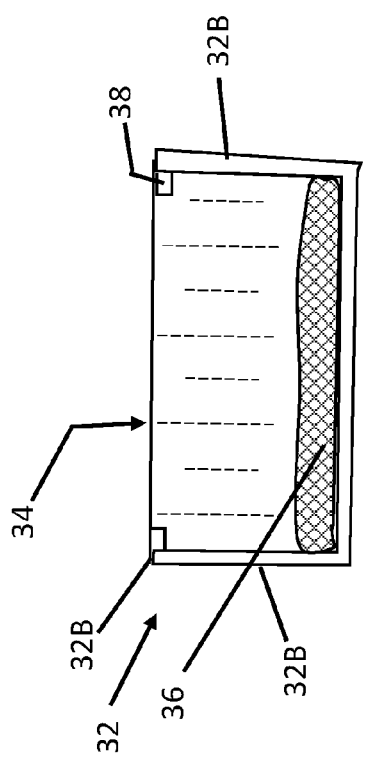
Figure 2:
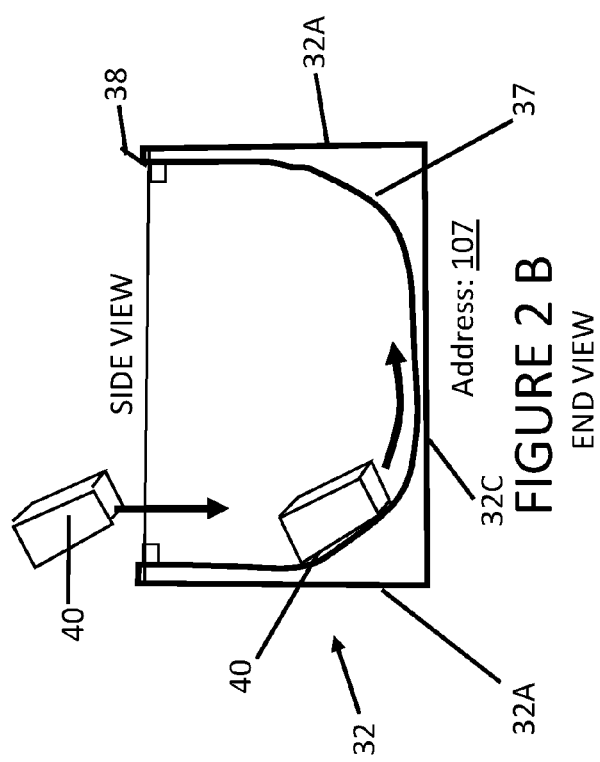

FIG. 2 A, shows one embodiment for container design which includes a padding element.

FIG. 2 B shows one embodiment for container design which includes a sloped or curved interior surface to prevent parcel damage.

The following list shows a reference number to the drawings:

| No. | Description |
|---|---|
| 30 | drone docking system 30 for deposit of items delivered by drone 50 |
| 31 | drone docking station 31 for deposit of items delivered by drone hereinafter referred to as drone dock, docking station, the box, or drone box or docking box) for deposit of items delivered by drone. |
| 32 | drone docking station structure 32 |
| 32A | side and side surface 32A of structure 32 |
| 32B | end and end surface 32B of structure 32 |
| 32C | bottom and bottom surface 32C of structure 32 |
| 33 | closeable and openable hinged or movable/motorized sliding doors 33 on the dock structure 32 |
| 34 | drone structure/container opening 34 |
| 35 | mechanism or means 35 for drone 50 to releasably engage and disengage the structure 32 including connections to the power source and information connections |
| 36 | foam or soft padding 36 |
| 37 | surface curvature 37 to slow parcel 40 acceptance into container 31 |
| 38 | top surface 38 of docking structure 32 surrounding the perimeter of the opening 33 |
| 39 | means for securing and mounting 39 docking station 31 at a selected location/address 107 |
| 40 | parcels 40 such as food items, groceries, tools, electronics, documents, and the like |
| 50 | drone 50 |
| 61 | camera system 61 internal/external to compartment of drone 50 |
| 64 | controllable catch arms 64 or the like |
| 72 | temperature control 72 |
| 73 | barcode reader 73 - infrared or other |
| 100 | location and communication 100 with docking station 31 |
| 107 | selected location 107 and GPS address for station 31 |

DETAILED DESCRIPTION OF THE PREFERRED EMBODIMENTS

Disclosed herein is a system 30 and device for a drone docking station 31 (hereinafter referred to as drone dock, the box, or drone box or docking box) for deposit of items 40 delivered by drone 50 and for pickup-up of items to be shipped via drone. Items may include but not be limited to food items, groceries and parcels. A secure, porch, roof, window or otherwise building mounted 39 box may be anchored through hardware into wood, concrete or masonry or any material used in the construction of residential or commercial structures. The box also can be configured to mount to an existing mailbox post and or take the place of the mailbox at a selected location 107.

In its preferred embodiment the box may accommodate any item within size parameters that are drone deliverable. Typically a drone can carry a parcel the size of 2 feet times 2 feet and weighing around 5 lbs, however the disclosure is not limited by any particular size delivery provided it can be carried by a drone. The drone dock may be made of either an abs plastic or steel construction or other suitable material including but not limited to woods, plastics, ceramics, rubber or other polymers and synthetic materials. It will be offered in different sizes to allow for high volume customers that receive multiple parcels in a given time period.

The basic elements making of components of the box enable it to carry out one or more the following functions:

A means of locating the box such that drone can approach and dock with it.

A means of engaging 35 the box 32 such that a stable connection or attachment can be made.

A means 64 of transferring the contents of the drone 50 to the interior of the box 32.

A means 64 of transferring the contents from inside the box 32 to the drone 50.

An enclosure 32 as a means for preserving and securely storing the delivered goods 40 once in the box 32.

A means of disengaging 35 from the box 32.

A means of communication 100 between the drone 50 and the drone dock 31, either directly or through a remote server.

One or more functional components incorporated within the box to allow for preservation and security of the stored goods, and to prevent damage 36 during the transfer and or subsequent storage.

A means 39 of securing the box to a structure located at a residential or commercial address 107.

The Drone Dock in its various embodiments may further incorporate one or more of the following features, in any combination, combining to deliver a total secure solution for home or office drone deliveries.

A secure bar code 73 that drone accesses to direct the dock to open its top to allow for safe delivery into the box may be employed. In lieu of code drone may trigger opening of drone dock by simply accessing its landing base. Communication between the drone and the drone dock may be through electronic or magnetic connection that is made upon the drone landing and connecting with the box. The communication may also be over a wireless network such as Wi-Fi, Bluetooth satellite etc. and others that would be recognized by those skilled in the art. The communication may be directly between the docking or delivery box and the drone itself upon docking in order to facilitate the transmission of a code in a lock box. In alternative embodiments a remote server may be employed whereby the drone communicates with a communication system 100 its specific location/address 107 and docking details to the remote server, upon which the remote server pings or otherwise delivers a signal directly to the box or an associated IP address triggering it to unlock and open. The box may also communicate via RFID in order to identity itself to the drone (or vice versa) and communicate a bar code 73 or I.D. sequence required for docking and unlocking. In similar fashion a Bluetooth signal may be employed to communicate a code to the drone once the drone is in range of the box and its blue tooth signal. In certain embodiments the box will deliver GPS guidance to the drone for proper docking and delivery into box.

Upon successful deposit in the dock, the top 33 will close securely assuring that entry into the dock by vandals, thieves or animals is prohibited. Retrigger to close may be accomplished in similar fashion to the signal to open either by direct communication between the drawing and the box or through a remote server. The box 32 may also be designed to automatically close and lock once the drone 50 un-docks from the box or once the box has detected the weight of the contents added or subtracted from its interior floor 32C.

The drone dock 31 may also have certain features in order to facilitate an efficient and delicate transfer of the delivery goods. For example, the interior 34 of the box may be curved 37 in nature to allow the goods 40 released into the box to slide to a gentle halt and not be damaged by an abrupt stop onto a flat surface. Other embodiments may include a foam bottom 36 or other soft type surfaces to prevent damage of goods during transfer.

In still other embodiments the drone dock may be temperature controlled 72 to ensure proper storage of the delivered goods. This may include both heating and cooling functions depending upon the season and the nature of the delivered goods. The box may additionally have separate compartments for receiving goods that specifically should be heated, cooled, or kept at room temperature range in any season.

The drone dock may also incorporate use of upward extensions on one or more sides of the box to provide a wind block to facilitate a smooth landing. Other structures may be employed to provide for easier and more accurate engagement of the drone with the drone dock such as extended platforms, slides, funnels, and other type structures that would enable a two phased docking approach. Such structures would first allow for contact between the drone and extended drone dock structure, and facilitate a guided placement into the proper docking position.

The box design may allow a drop of the item into its pressure sensitive lids. The item will drop in and the lids will return to their home position and not allow for access to the inserted item except by the intended recipient.

The Drone Dock will then report to its owner and the shipper and the shipping company that the item is securely in the dock and come and retrieve it. The drone dock may also report charging status as well as takeoff status to shipper.

The Drone Dock may include a connection means 35 power source. The power source may be through a connection to an electrical outlet, onboard battery power, wind power or powered by connections for solar panels or by solar panels mounted on the box. The preferred embodiment will feature a solar panel that will provide the power needed by the unit for all of its features. The unit is also available with a 110 volt power supply for easy access to standard power supplies. The container may have one or more lighting mechanisms inside the container powered by any of the means herein. The lighting may be triggered by opening the box.

In further embodiments the Drone Dock will feature a charging station that will allow the delivering drone to park on the drone dock and receive a charge replenishment. Drone Dock may include a charging tentacle of certain specifications developed with drone manufacturers to design a charging tentacle that works with the drone dock. The Drone Dock may feature a heated top to insure that the access area is always operational in cold temperatures, and prevent the collection of snow or ice that may inhibit its function.

In still other embodiments the Drone Dock will offer a camera 61 mount for added security and may employ alternative embodiments such as security devices including alarms, motion detectors, and the like.

The drone dock may have a number of tracking functionalities. The Drone Dock with its self-contained power supply in certain embodiments can broadcast the GPS coordinates to its owner in the event it is taken from its base location. The owner of the box may retrieve the contents easily through a simple code entered, key or cell phone app.

Other embodiments include a system functioning to enable a drone picking up a package. In one embodiment, the drone will approach and dock with the docking station and drop a parcel or otherwise as described herein. The container may have divided sections, one or more for dropping off or delivering parcels, and another for picking up or sending parcels or packages. The drone may communicate over a network as described herein and receive a signal that a pickup is to be made. When a user places an item into the pickup section of the container a signal may be stored on the container to be sent to an approaching drone, or may be sent to a remote server which in turns communicates with the drone that a pickup is needed. In some embodiments the container may be outfitted with sensors capable of registered the presence of a package. In still other embodiments the user may send a signal through a mobile phone or other electronic or computing device (either directly or through an application) that registers the pickup. The app or other software may then notify the drone, and the drone upon receiving the signal will carry out the pickup. The drone may then drop its contents into the delivery section of the box, or dock directly with the pickup section of the container if the drone is not carrying any items for delivery. In the event a delivery is to be made, the drone may first dock over the delivery or receiving section of the container, drop its contents, and then under its own power move over the pickup section of the container. In other embodiments the docking equipment connected with the drone during a landing is able to slide or move across the top of the container such that the drone is moved over the top of the pickup section of the container. One example of this may include small surfaces that connect with the legs of a drone, these surfaces being mounted on electronically controlled slides or rails that are able to move the docked drone across the top of the container. Many design schemes for moving the drone from one section to the next will be recognized by those skilled in the art and are included as part of the disclosure herein.

Other embodiments include a drone with a mounted camera 61 or a bar code scanner. When the drone dock and container box is opened the drone may then capture an image of the contents, or scan the surfaces of any parcels for detection of a bar code. This information once registered by the drone, may be process by an on board computer or sent over a network to a remote server for processing. In the case of a captured image the remote server may be connected to a computer that carries out image analysis in order to retrieve relevant information from the markings on a package such as a bar code. This information will then be processed and sent back to the drone in the form of instructions to drone for retrieval of the package from the box.

In still other embodiments the container box of the docking station may assist a drone in retrieving the contents of the box. For example the floor of the container may be electronically controlled to raise, lower, or move laterally in order to place the item with a drones receiving area where it is capable of clasping onto the item or items.

FIG. 1 shows a drone 50 and a parcel 40 being delivered by the drone 50 into the delivery box 31. Next is shown the doors 33 that may open upon engagement of a mechanism 35 the drone 50 in this particular embodiment. Further is shown the opening 34 of the structure 32 that receives the delivered items 40. One mechanism 35 shown is the manner by which the drone 50 may engage the docking station 31 and communicate information, transfer energy and power, register magnetic engagement, or otherwise as disclosed herein. Drone structure 32 is the structure of the delivery container 31 with sides 32A, B, a bottom 32C and a top portion 38. The figure shows one exemplary embodiment, and does not limit the text of the disclosure herein.

FIG. 2 A shows a general structure 32 for the system 31. Shown here is a foam or other padding component 36 in order to cushion the bottom of the box for when parcels 40 are dropped into it by a drone 50. FIG. 2 B indicates the curvature 37 of the interior 34 of the structure 32, which may be utilized in order to prevent an abrupt landing of delivered items 40 when dropped into a box 32. In embodiments with this feature a parcel 40 may gently slide to a halt.

As used in the claims, "personal items" is defined to mean groceries and other food items, mail, courier deliveries, and packages or parcels.

The phrase "in one embodiment" is used repeatedly. The phrase generally does not refer to the same embodiment; however, it may. The terms "comprising," "having" and "including" are synonymous, unless the context dictates otherwise. The following illustrations of various embodiments use particular terms by way of example to describe the various embodiments, but this should be construed to encompass and provide for terms such as "method" and "routine" and the like.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way. The characteristics and utilities of the present invention described in this summary and the detailed description below are not all inclusive. Many additional features and advantages will be apparent to one of ordinary skill in the art given the detailed description.

The invention claimed is:

1. A drone docking station (31) for accepting deliveries of packages from a drone comprising: A box (32) for accepting drone deliveries of food items, groceries or parcels (40); and further the box (32) is mounted (39) to a building, house, post, porch, roof, window or existing mailbox, the box (32)

has an interior that is temperature controlled, and the box (32) is further comprising a curved bottom (37) in the interior (34) of the box (32) to mitigate the abruptness of dropping an item (40) into the box (32), and a device (100) mounted on the box (32) for communicating with the drone (50).

2. The docking station of claim 1 wherein the device (100) is capable of communicating GPS information to the drone (50) to facilitate docking the drone (50) with the docking station (31) and box (32).

3. The docking station of claim 1, wherein delivery of items (40) from the drone (50) into the docking station (31) is further comprising a trigger that sends a signal to one or more parties that the items (40) have been delivered.

4. The docking station (31) of claim 1 further comprising a mounted security camera (61) and a bar code (73) scanner wherein the mounted security camera (61) and the bar code (73) scanner confirm delivery of the box (32) from the drone (50).

5. The docking station of claim 1, wherein the drone receives a signal (100) to retrieve an item (40) from a specific location (107), and upon subsequent docking with a docking station (31) at a location associated with the signal, retrieves the item (40).

6. The docking station (31) of claim 1, wherein the drone (50), equipped with a bar code (73) scanner, scans the contents of the docking station box (32) and retrieves any packages (40) marked with an authorizing bar code.

7. The docking station of claim 1, wherein the drone, equipped with a camera (61), captures an image of the items (40) of the docking station box (32), and retrieves any items marked for pickup according to an image analysis of the captured image.

8. A drone docking station (31) and delivery box (32) for accepting drone deliveries (40) comprising:

a means of locating the drone dock (100) such that a drone (50) may accurately approach and dock with the drone (50);

a means of engaging (35) the drone dock (31) such that a stable connection or attachment can be made;

a means of transferring (64) the contents (40) of the drone (50) to the interior (34) of the drone dock (31);

a means of preserving and securely storing within a container (32) the delivered goods (40) once interior (34) to the drone dock (31);

a means of disengaging (35) from the drone dock (31);

a means of communication (100) between the drone (50) and the drone dock (31), either directly or through a remote server;

one or more functional components incorporated within the box (32) to allow for preservation and security (32, 33) of the stored goods (40), the functional component comprising a curved bottom (37) and further comprising a foam pad (36) to prevent damage during the transfer and or subsequent storage and the box (32) having an interior that is temperature controlled; and a means of securing the box (32) to a structure located at a residential or commercial address (107).

9. The docking station of claim 8, wherein delivery of items (40) from the drone (50) into the docking station (31) is further comprising a trigger that sends a signal to one or more parties that the items (40) have been delivered.

10. The docking station (31) of claim 8 further comprising a mounted security camera (61) and a bar code (73) scanner wherein the mounted security camera (61) and the bar code (73) scanner confirm delivery of the box (32) from the drone (50).

11. The docking station of claim 8 wherein the means of communication (100) is capable of communicating GPS information to the drone (50) to facilitate docking the drone (50) with the docking station (31) and box (32).

* * * * *